(12) United States Patent
Hood et al.

(10) Patent No.: US 9,406,966 B2
(45) Date of Patent: Aug. 2, 2016

(54) FUEL CELL ASSEMBLY

(71) Applicant: Intelligent Energy Limited, Loughborough (GB)

(72) Inventors: Peter David Hood, Loughborough (GB); Christopher James Gurney, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 41 days.

(21) Appl. No.: 14/378,644

(22) PCT Filed: Jan. 17, 2013

(86) PCT No.: PCT/GB2013/050096
§ 371 (c)(1),
(2) Date: Aug. 13, 2014

(87) PCT Pub. No.: WO2013/121171
PCT Pub. Date: Aug. 22, 2013

(65) Prior Publication Data
US 2015/0030950 A1    Jan. 29, 2015

(30) Foreign Application Priority Data
Feb. 15, 2012 (GB) .................... 1202591.2

(51) Int. Cl.
*H01M 8/04* (2016.01)
*H01M 8/24* (2016.01)
*H01M 8/10* (2016.01)

(52) U.S. Cl.
CPC ........ *H01M 8/2485* (2013.01); *H01M 8/04014* (2013.01); *H01M 8/04089* (2013.01);
(Continued)

(58) Field of Classification Search
CPC ................. H01M 2008/1095; H01M 2250/30; H01M 8/04014; H01M 8/04089; H01M 8/04097; H01M 8/04104; H01M 8/04335; H01M 8/0435; H01M 8/04753; H01M 8/04768
See application file for complete search history.

(56) References Cited

U.S. PATENT DOCUMENTS 5,851,689 A    12/1998  Chen
6,248,466 B1 *  6/2001  Takahashi ........... H01M 8/0247
                                                    429/434
(Continued)

FOREIGN PATENT DOCUMENTS

EP    1826858    8/2007
FR    2918798    10/2007
(Continued)

OTHER PUBLICATIONS

International Search Report dated Oct. 23, 2013, issued in PCT/GB2013/050096.
(Continued)

*Primary Examiner* — Patrick Ryan
*Assistant Examiner* — Jose Colucci Rios
(74) *Attorney, Agent, or Firm* — Baker & Hostetler LLP

(57) ABSTRACT

A fuel cell assembly comprising an enclosure having a fuel cell stack mounted therein, and an inlet opening into the enclosure. The fuel cell stack having an inlet face for receiving coolant/oxidant fluid. The fuel cell assembly further comprises a delivery gallery extending from the inlet in the enclosure to the inlet face of the fuel cell stack, the delivery gallery having a first region and a second region separated by an aperture. The delivery gallery and aperture are configured such that, in use, coolant/oxidant fluid within the first region of the delivery gallery is turbulent, and coolant/oxidant fluid within the second region of the delivery gallery has a generally uniform pressure.

20 Claims, 3 Drawing Sheets

(52) U.S. Cl.
CPC ........ *H01M8/04104* (2013.01); *H01M 8/2475* (2013.01); *H01M 8/0435* (2013.01); *H01M 8/04097* (2013.01); *H01M 8/04335* (2013.01); *H01M 8/04753* (2013.01); *H01M 8/04768* (2013.01); *H01M 8/2415* (2013.01); *H01M 2008/1095* (2013.01); *H01M 2250/30* (2013.01); *Y02B 90/18* (2013.01); *Y02E 60/50* (2013.01)

(56) References Cited

U.S. PATENT DOCUMENTS

| | | | | |
|---|---|---|---|---|
| 6,720,101 | B1 * | 4/2004 | Dong | H01M 8/2475 429/435 |
| 2003/0152822 | A1 | 8/2003 | Bruck et al. | |
| 2003/0219643 | A1 | 11/2003 | Yang et al. | |
| 2004/0053087 | A1 * | 3/2004 | Akikusa | B60K 6/32 429/425 |
| 2006/0204806 | A1 * | 9/2006 | Takada | H01M 8/0267 429/434 |
| 2007/0099061 | A1 | 5/2007 | Na et al. | |
| 2011/0159391 | A1 | 6/2011 | Saito et al. | |
| 2011/0269043 | A1 | 11/2011 | Hood | |

FOREIGN PATENT DOCUMENTS

| | | |
|---|---|---|
| JP | H01320775 | 12/1989 |
| JP | 2007165174 | 6/2007 |

OTHER PUBLICATIONS

United Kingdom Search Report dated May 22, 2012, issued in GB patent application 1202591.2.

International Preliminary Report on Patentability dated Aug. 19, 2014, issued in International patent application PCT/GB2013/050096.

* cited by examiner

FUEL CELL ASSEMBLY

CROSS-REFERENCE TO RELATED APPLICATIONS

This application is a National Stage of International patent application PCT/GB2013/050096, filed on Jan. 17, 2013, which claims priority to Great Britain Patent Application No. 1202591.2, filed on Feb. 15, 2012, the disclosures of which are incorporated by reference in their entirety.

The invention relates to fuel cell assemblies, in particular to enclosures for mounting open cathode fuel cell stacks.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion (proton) transfer membrane, with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack may be formed comprising a number of such membranes arranged with separate anode and cathode fluid flow paths. Such a stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached. Cooling may be achieved by forcing air through the cathode fluid flow paths. In an open cathode stack, the oxidant flow path and the coolant path are the same, i.e. forcing air through the stack both supplies oxidant to the cathodes and cools the stack.

Providing uniform air delivery to the cathode electrode surfaces within a fuel cell can be challenging when using compact assemblies. The use of plenum profiles and volumes may not be possible with tight volumetric packaging constraints.

According a first aspect of the invention, there is provided a fuel cell assembly comprising:
  an enclosure having a fuel cell stack mounted therein,
  an inlet opening into the enclosure,
  the fuel cell stack having an inlet face for receiving coolant/oxidant fluid,
  a delivery gallery extending from the inlet in the enclosure to the inlet face of the fuel cell stack,
  the delivery gallery having a first region and a second region separated by an aperture,
  wherein the delivery gallery and aperture are configured such that, in use, coolant/oxidant fluid within the first region of the delivery gallery is turbulent, and coolant/oxidant fluid within the second region of the delivery gallery has a generally uniform pressure.

Such a fuel cell assembly can advantageously provide turbulent flow in the first region of the delivery gallery which can be used to cool any components located in the first region, and also provide generally uniform pressure in the second region such that the coolant/oxidant can be uniformly applied to the layers in the fuel cell stack.

The aperture may define a restriction to flow between the first and second regions of the delivery gallery. The aperture may represent a reduction in cross-sectional area in the flow path of the coolant/oxidant flow between the first and second regions of the delivery gallery. In this way, a pressure change experienced by the oxidant/coolant as it flows through the aperture can cause the oxidant/coolant to have a generally uniform pressure along the length of the fuel cell stack.

The aperture may extend in a longitudinal direction. The aperture may be in the vicinity of an end face of the fuel cell stack or an edge between two faces of the fuel cell stack. The longitudinal direction of the aperture may extend along the edge between two faces of the fuel cell stack. These two faces of the fuel cell stack may be a bottom end face and an inlet face, or a top end face and an outlet face.

The width of the aperture may vary in the longitudinal direction, which may assist in providing a uniform air pressure in the second region. The width of the aperture may vary uniformly or non-uniformly in the longitudinal direction. The width of the aperture may be a function of a distance from a fan or air flow generator. The aperture may get wider in the longitudinal direction away from a fan or air flow generator. This can be advantageous in equalising the air pressure in the second region, even though the air pressure in the first region can be lower at positions further away from the fan or air flow generator.

The aperture may be defined, at least in part, by an end face of the fuel cell stack and optionally a protrusion extending towards the end face of the fuel cell stack. The end face of the fuel cell stack may be a bottom end face. The protrusion may extend away from an internal wall of the enclosure, and in some examples may comprise part of an internal wall of the enclosure. Providing the aperture in this way can enable the transition between the first region and second region to be located in the vicinity of the end of the stack. The second region may be defined, at least in part, by the inlet face of the fuel cell stack. The first region may be independent of the inlet face of the fuel cell stack.

The fuel cell assembly may comprise a diffuser within the first region of the delivery gallery. The diffuser may be configured to impart turbulence on oxidant/coolant received from the inlet of the enclosure. The diffuser may be fixed such that it is not free to move in normal use of the fuel cell assembly. Such a diffuser can provide a convenient means of imparting turbulence that does not require any moving parts or active components that may be more susceptible to damage and may consume power.

The diffuser may comprise one or more fuel cell control system components, such as a printed circuit board (PCB), disposed within the delivery gallery. In this way, particularly efficient cooling of the fuel cell control system components can be achieved without requiring any additional components.

The fuel cell assembly may further comprise a fan or air flow generator located within the enclosure configured to cause the coolant/oxidant to be transferred from the inlet in the enclosure to the inlet face of the fuel cell stack. The axis of the fan may be directed away from, or otherwise may not point towards, the aperture. This can encourage turbulent flow in the first region of the delivery gallery as the coolant/oxidant encounters one or more components to diffuse the flow as it proceeds to the aperture to the second region of the delivery gallery.

The axis of the fan may be perpendicular or transverse to the plane of the layers in the stack. The axis of the fan may be perpendicular to the direction of coolant/oxidant flow through the stack. Aligning the fan and fuel stack in this way can provide a compact fuel cell assembly and encourage turbulent flow of the coolant/oxidant in the first region.

The fuel cell stack may comprise an outlet face for expelling said coolant/oxidant fluid,
  the fuel cell stack further including a pair of end faces extending transversely between the inlet face and outlet face, the enclosure defining a flow path for the coolant/oxidant fluid that is configured to guide the coolant/oxidant fluid to the inlet face, from the outlet face, and over at least one of the end faces.

There may be provided a fuel cell assembly comprising:
an enclosure having a fuel cell stack mounted therein,
the fuel cell stack having an inlet face for receiving coolant/oxidant fluid and an outlet face for expelling said coolant/oxidant fluid,
the fuel cell stack further including a pair of end faces extending transversely between the inlet face and outlet face,
the enclosure defining a flow path for the coolant/oxidant fluid that is configured to guide the coolant/oxidant fluid to the inlet face, from the outlet face, and over at least one of the end faces.

Providing the coolant/oxidant flow path in this way can improve the cooling of the fuel cell stack and provide a compact enclosure.

The enclosure may define the flow path for the coolant/oxidant fluid to guide the coolant oxidant/fluid over both the end faces. This can improve the cooling effect of the fuel cell stack even further.

The enclosure may define an exhaust gallery extending over and adjacent to one end face of the fuel cell stack. The enclosure may further define at least one exhaust port at an edge or corner of the enclosure. An edge can be considered as the meeting of two sides or surfaces and a corner can be considered as the meeting of three sides or surfaces of the enclosure.

Providing the at least one exhaust port at an edge or corner of the enclosure can help to prevent the port from being blocked when the assembly is placed next to other objects; the ports can be considered as protected because of their location.

The exhaust gallery may be at least partly defined by the outlet face of the fuel cell stack, a top end face of the fuel cell stack, and one or more internal surfaces of the enclosure. In this way, the oxidant/coolant can be exposed to the top end face of the fuel cell stack before it exits the assembly through the exhaust port.

The edge or corner of the enclosure defining said at least one exhaust port may be disposed at or beyond a peripheral edge of the fuel cell stack. This can enable the oxidant/coolant to flow over a large proportion of the end face of the fuel cell stack before exiting the exhaust port.

The at least one exhaust port may extend around more than one edge of the enclosure. Providing a relatively large exhaust port can enable acceptable performance of the fuel cell stack to be maintained when the exhaust port is partially obscured.

The fuel cell assembly may further comprise a separation wall configured to separate the delivery gallery from an exhaust gallery. At least part of the separation wall may be movable so as to selectively provide an opening between the delivery gallery and the exhaust gallery. This can enable recirculation of the warm exhaust coolant/oxidant to the delivery gallery, thereby pre-heating the coolant/oxidant that is provided to the inlet face of the fuel cell stack.

The at least part of the separation wall may be moveable in accordance with the temperature of the coolant/oxidant in the exhaust gallery and/or delivery gallery. In this way, recirculation can be selectively provided to improve the performance of the fuel cell stack.

The fuel cell assembly may further include fuel cell control system components disposed within the exhaust gallery. In this way, the flow path of the oxidant/coolant can be used to cool the fuel cell control system components.

The enclosure may define a delivery gallery extending over and adjacent to one end face of the fuel cell stack. The enclosure may further define at least one inlet port at an edge or corner of the enclosure. Providing the at least one inlet port at an edge or corner of the enclosure can help to prevent the port from being blocked when the assembly is placed next to other objects; the ports can be considered as protected because of their location.

The delivery gallery may be defined at least in part by the inlet face of the fuel cell stack, a bottom end face of the fuel cell stack, and one or more internal surfaces of the enclosure. In this way, the oxidant/coolant can be exposed to the bottom end face of the fuel cell stack before it enters the fuel cell stack.

The edge or corner of the enclosure defining said at least one inlet port may be disposed at or beyond a peripheral edge of the fuel cell stack. This can enable the oxidant/coolant to flow over a large proportion of the end face of the fuel cell stack before entering the fuel cell stack.

The at least one inlet port may extend around more than one edge of the enclosure. Providing a relatively large inlet port can enable acceptable performance of the fuel cell stack to be maintained when the inlet port is partially obscured.

The fuel cell assembly may further include fuel cell control system components disposed within the delivery gallery. In this way, the flow path of the oxidant/coolant can be used to cool the fuel cell control system components.

The walls of the fuel cell stack may be generally parallel with the walls of the enclosure. This can provide a compact assembly.

The fuel cell assembly may further comprise a fan or air flow generator located within the enclosure configured to cause the coolant/oxidant to be transferred along the flow path. The axis of the fan may be perpendicular or transverse to the plane of the layers in the stack. The axis of the fan may also be perpendicular to the direction of coolant/oxidant flow through the stack. Aligning the fan and fuel stack in this way can provide a compact fuel cell assembly.

The fuel cell assembly may comprise:
an inlet opening into the enclosure,
a delivery gallery extending from the inlet in the enclosure to the inlet face of the fuel cell stack,
the delivery gallery having a first region and a second region separated by an aperture,
wherein the delivery gallery and aperture are configured such that, in use, coolant/oxidant fluid within the first region of the delivery gallery is turbulent, and coolant/oxidant fluid within the second region of the delivery gallery has a generally uniform pressure.

According to a further aspect, there is provided a portable electronic device charging unit comprising any fuel cell assembly disclosed herein.

The invention will now be described by way of example, and with reference to the accompanying drawings in which:

FIG. 1b shows an end cross-sectional view of the assembly on line b-b of FIG. 1a; and FIG. 1c shows a side cross-sectional view of the assembly on line c-c of FIG. 1a.

Embodiments disclosed herein relate to a fuel cell assembly comprising an enclosure having a fuel cell stack mounted therein.

In some examples, the fuel cell assembly has a delivery gallery extending from an inlet in the enclosure to an inlet face of the fuel cell stack, the delivery gallery having a first region and a second region separated by an aperture. The delivery gallery and aperture are configured such that, in use, air within the first region of the delivery gallery is turbulent, and air within the second region of the delivery gallery has a generally uniform pressure. This can enable effective cooling of electronic components located in the first region due to the turbulent air flow, whilst also providing efficient use of the fuel cell stack as air is distributed evenly between layers in the fuel cell stack.

Alternatively, or additionally, the enclosure defines a flow path for air through the fuel stack that guides the air over at least one end face of the stack. Guiding the air in this way can provide additional cooling to the stack and thermally decouple the stack from the enclosure. The fuel cell assembly may have a delivery gallery such that air can be passed over a bottom end face of the stack before entering an inlet face of the stack and/or an exhaust gallery such that air that leaves the stack through an outlet face can be passed over a top end face of the stack before exiting the assembly.

Figure 1A:
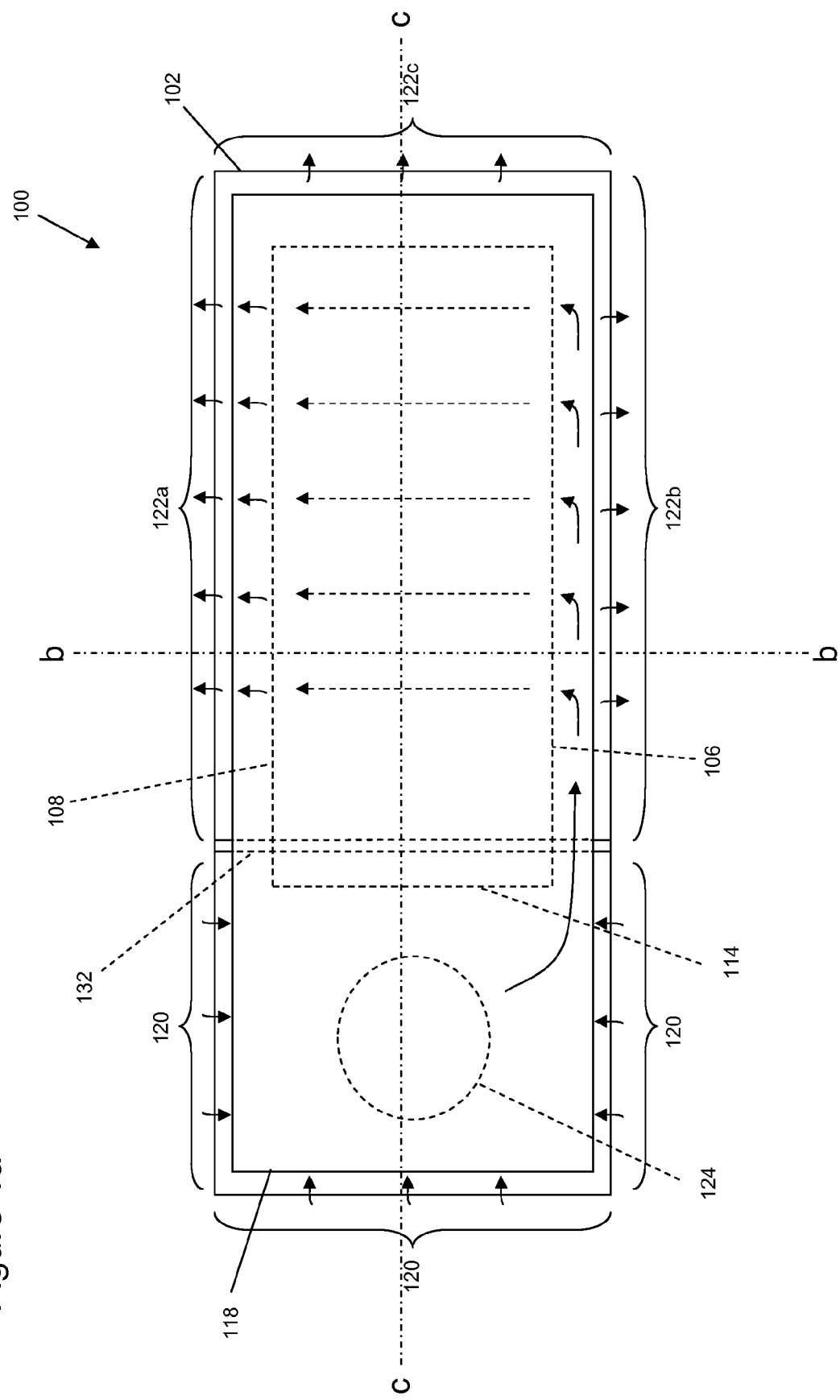
FIG. 1a shows a schematic plan view of a fuel cell assembly according to an embodiment of the invention.
Figure 1B:
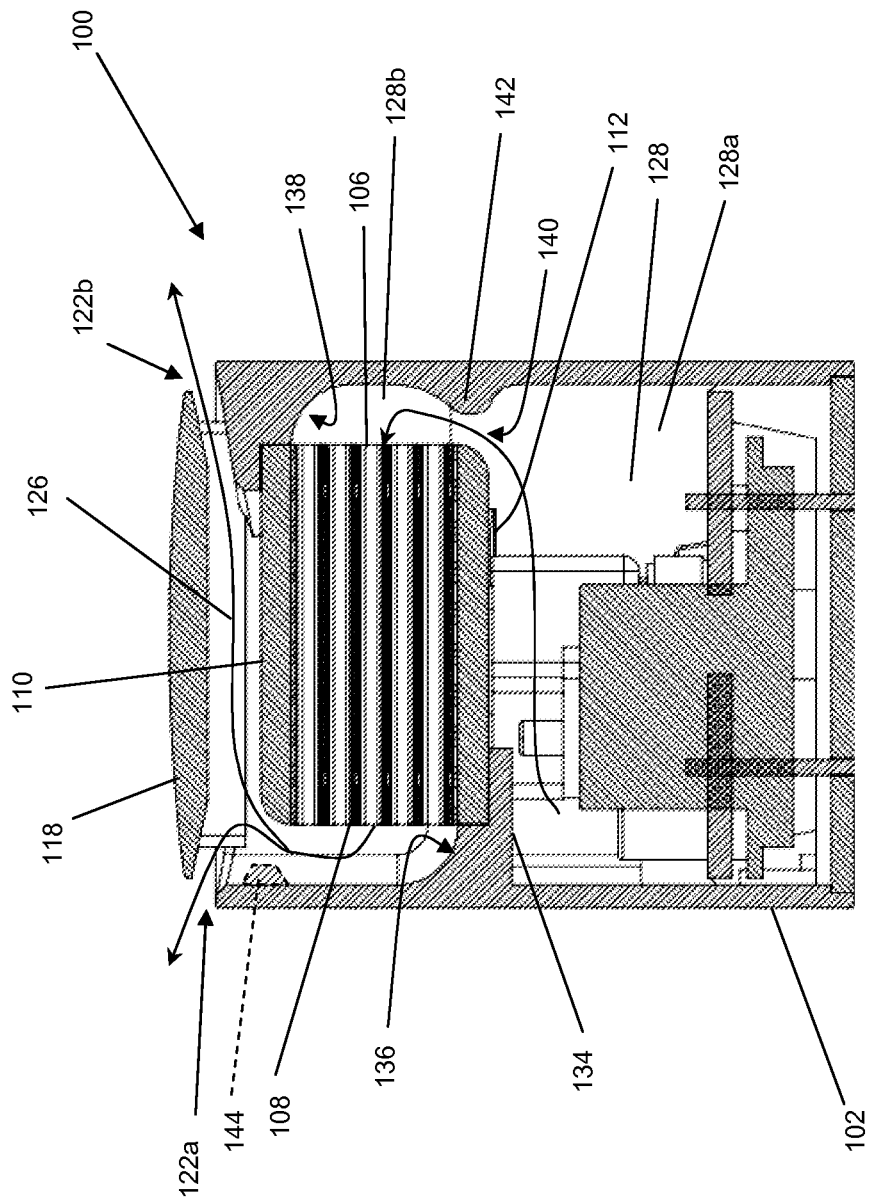
Figure 1C:
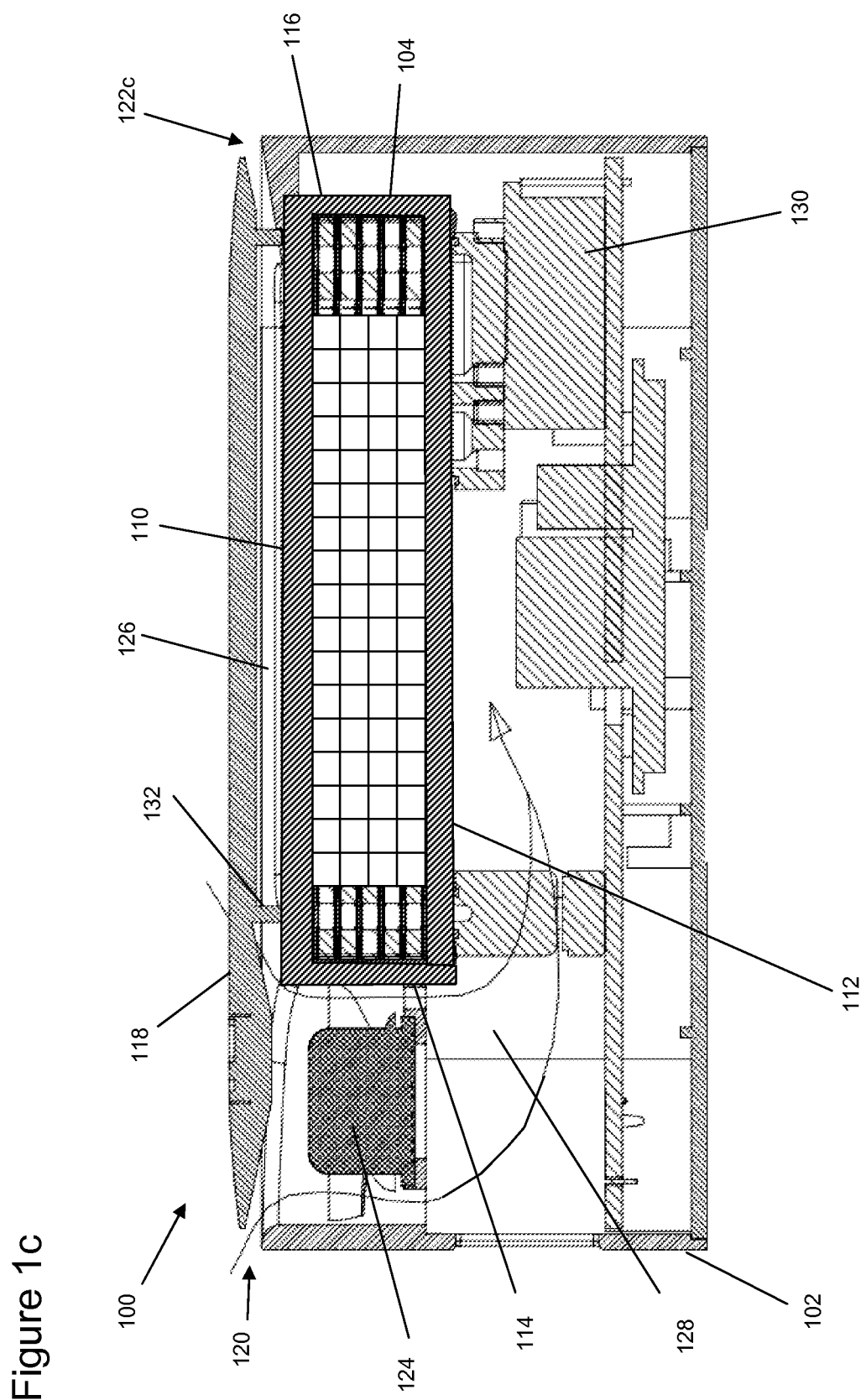

FIGS. 1a, 1b and 1c illustrate a fuel cell assembly 100 according to an embodiment of the invention. FIG. 1a shows a top view of the assembly 100. FIG. 1b shows a cross-sectional view perpendicular to the assembly 100 along the line b-b in FIG. 1a. FIG. 1c shows a cross-sectional view longitudinal to the assembly 100 along the line c-c in FIG. 1a.

The fuel cell assembly 100 has an enclosure 102 having a fuel cell stack 104 mounted therein. The walls of the fuel cell stack 104 are generally parallel with the walls of the enclosure 102. The fuel cell stack 104 has an inlet face 106 for receiving fluid, such as coolant or oxidant fluid. The fluid may be air, and will be referred to as air for the rest of the description of FIGS. 1a, 1b and 1c. The fuel cell stack 104 also has an outlet face 108 for expelling the air. The inlet face 106 and outlet face 108 are opposing faces of the fuel cell stack 104. In the example of FIG. 1, the inlet and outlet faces 106, 108 can be considered as longitudinal side faces of the fuel cell stack 104.

The fuel cell stack 104 also has end faces extending transversely between the inlet face 106 and the outlet face 108. The fuel cell stack has a top end face 110 and a bottom end face 112 on opposing sides of the fuel cell stack 104. The top and bottom end faces 110, 112 are located parallel to the planes of the layers that make up the stack 104. The fuel cell stack 104 also has two side end faces 114, 116 on opposing sides of the fuel cell stack 104. The side end faces 114, 116 are transverse to the planes of the layers that make up the fuel cell stack 104.

The enclosure 102, at least in part, defines a flow path for guiding the air over at least one of the end faces 110, 112, 114, 116 and most preferably at least the top and bottom end faces 110, 112. Arrows indicating the direction of air flow through the assembly 100 are included in FIGS. 1a to 1c. In this way, additional cooling can be provided to the fuel cell stack 104. Also, a compact assembly 100 can be provided.

Furthermore, the coupling of heat generated by the fuel cell stack 104 to the enclosure 102 can be reduced as the fuel cell stack is substantially detached from the enclosure 102. This can be particularly advantageous for examples where the enclosure is made from a heat conducting material such as aluminium. Such enclosures may have a maximum operating temperature. Therefore, detaching the fuel cell stack 104 from the enclosure 102 by providing regions of the delivery gallery 128 and/or exhaust gallery 126 therebetween can help to keep the temperature of the enclosure 102 below its maximum operating temperature.

A thermal coating (not shown) may be provided on one or more of the inside surfaces of the enclosure 102 that define the exhaust gallery 126 in order to thermally isolate the heat in the exhaust air from the enclosure 102.

In this example, the top surface of the enclosure 102 comprises a baffle 118 that is spaced apart from the side walls of the enclosure 102 in order to provide an opening into the enclosure 102 around the perimeter of the baffle 118. As will be discussed below, the opening around the baffle 118 can provide inlet and exhaust ports 120, 122 for the air on the edges or corners of the enclosure 102. An edge of the assembly 100 can be considered as the meeting of two surfaces such as the baffle 118 and a side wall of the enclosure 102. A corner of the assembly 100 can be considered as the meeting of three surfaces such as the baffle 118 and two side walls of the enclosure 102.

Providing the inlet and exhaust ports 120, 122 in this way can help protect them from becoming blocked, for example if objects are placed on top of, or to the side of, the assembly 100.

As can be seen from FIG. 1a, substantially all of the opening around the baffle 118 can be used as either an inlet port 120 or an exhaust port 122, although this need not necessarily be the case. An advantage of having relatively large inlet and exhaust ports 120, 122 is that the stack 104 can function adequately when either one or both of the ports 120, 122 are partially obscured, for example up to 50% obscured.

The exhaust port 122 extends around the portion of the baffle 118 that is generally located above the stack 104. In this way, when the air exits the outlet face 108 of the stack 104 it exits the enclosure 102 through one or more of:
- a region of the exhaust port that is next to the outlet face 108 of the stack—this region of the exhaust port is shown with reference 122a in FIGS. 1a and 1b;
- a region of the exhaust port that is next to the inlet face 106 of the stack 104—this region of the exhaust port is shown with reference 122b in FIGS. 1a and 1b; and
- a region of the exhaust port that is next to a side end face 116 of the stack 104—this region of the exhaust port is shown with reference 122c in FIGS. 1a and 1c.

The baffle 118 is spaced apart from the top end face 110 of the stack in order to partly define an exhaust gallery 126 therebetween. The exhaust gallery 126 enables air to flow from the outlet face 108 of the stack 104 to any region of the exhaust port 122 over the top end face 110 of the stack 104. It will be appreciated that any air that exits the enclosure 102 through a region 122b, 122c of the exhaust port that is not next to the outlet face 108 of the stack 104 will have passed over the top end face 110 of the stack 104, thereby further cooling the stack 104. This air flow can be seen from the arrows in FIG. 1b.

The exhaust gallery 126 is defined by the outlet face 108 of the fuel cell stack 104, the top end face 110 of the fuel cell stack 106, a bottom surface of the baffle 118, one or more internal side surfaces of the enclosure 102, and first and second separation walls 132, 134 that are discussed in more detail below. The exhaust gallery 126 extends between the outlet face 108 of the stack 104 and the exhaust port 122 and is bound, at least in part, by the top end face 110 of the stack 104.

The inlet port 120 is provided by the remainder of the opening around the baffle 118; that is, the regions of the opening that are not an exhaust port 122.

A fan 124 is located within the enclosure 102 and sucks air into the enclosure 102 through the inlet port 120. This builds up the air pressure in the enclosure 102 such that air passes into the inlet face 106 of the stack, out of the outlet face 108 of the stack 104, and then out of the exhaust port 122. The combination of the low pressure drop of the settling volume in the delivery gallery 128 and the relatively high restriction offered by the inlet face 106 can promote a uniform longitudinal (relative to the fuel cell stack 104) air delivery. Although a fan 124 is described for this embodiment, it will be appreciated that any other generator of air flow could be used.

The fan 124 is located in the same plane as the layers of the stack 104. The axis of the fan 124, that is the direction of air flow through the fan, is perpendicular or transverse to the plane of the layers in the stack 104. The axis of the fan 124 is also perpendicular or transverse to the direction of air flow through the stack 104. Aligning the fan 124 and stack 104 in this way can provide a compact fuel cell assembly.

The fan 124 sucks air from outside the enclosure 102 into a delivery gallery 128, which may also be referred to as an inlet plenum. In this example, fuel cell control system components 130 are located in the delivery gallery 128. Being able to mount the components 130 in the delivery gallery 128 can make efficient use of space and therefore provide an advantageously small assembly. This can also avoid the need for a separate inlet plenum chamber (as would usually be employed) allowing for a more compact assembly. In addition, passing the air over the components 130 can provide for improved cooling of the components 130 and potentially pre-heating of the oxidant air, which can improve the performance of the fuel cell stack 104.

The delivery gallery 128 is defined by the inlet face 106 of the fuel cell stack 104, the bottom end face 112 of the fuel cell stack 106, a number of internal surfaces of the enclosure 102 and first and second separation walls 132, 134 that are discussed in more detail below.

The delivery gallery 128 extends between the inlet port 120 and the inlet face 106 of the stack 104 and is bound, at least in part, by the bottom end face 112 of the stack 104.

The delivery gallery 128 is separated from the exhaust gallery 126 by one or more of the following:

1. the fuel cell stack 104;
2. a first separation wall 132 that extends between the fuel cell stack 104 and the baffle 118; and
3. a second separation wall 134 that extends between the fuel cell stack 104 and the enclosure 102.

Part of the first separation wall 132 is visible in FIG. 1c and prevents air from passing directly to the exhaust gallery 126 over the top of the stack without passing through cathode flow channels in the stack 104. In this example, the first separation wall 132 is generally vertical and extends across the entire width of the stack 104 (orthogonal to the plane of the drawing of FIG. 1c). On the side of the stack 104 that includes the outlet face 108, the left-hand side of the stack 104 shown in FIG. 1b, the first separation 132 wall extends down the side of the stack 104 until it meets the second separation wall 134. This extension of the first separation wall 132 is not shown in the drawings.

The first separation wall 132 also serves to separate the inlet port 120 from the exhaust port 122 around the outside of the baffle 118.

The second separation wall 134 is visible in FIG. 1b and prevents air from passing from the delivery gallery 128 to the exhaust gallery 126 up the side of the stack without passing through cathode flow channels in the stack 104. In this example, the second separation wall 134 is generally horizontal and extends across the entire length of the stack 104 (orthogonal to the plane of the drawing of FIG. 1b). The second separation wall abuts the first separation wall 132 at one end and the enclosure 102 at the other end.

The second separation wall 134 is in this example has an angled upper surface 136 such that the region of the exhaust gallery that is adjacent to the outlet face 108 of the stack 104 is a tapering volume. This can guide air flow and/or permit more uniform air flow into the stack 104; the pressure drop across the inlet port 120 to the delivery gallery 128 can equalise the air distribution along the stack 104 whilst the pressure drop across each cell of the stack 104 and the asymmetric (tapering) region of the exhaust gallery 126 next to the outlet face 108 of the stack, can be used to regulate the flow between cells. This can remove the need for an inlet plenum chamber (as would usually be employed) allowing for a more compact assembly.

It will be appreciated that the angled upper surface 136 of the second separation wall may be curved, straight, a combination of curved and straight, or any other profile that defines the region of the exhaust gallery that is adjacent to the outlet face 108 of the stack 104 as a tapering volume or provides optimal air flow guiding.

Similarly, a portion 138 of the internal surface of the enclosure 102 that is next to the inlet face 106 of the stack 104 may be angled such that the region of the delivery gallery 128 that is adjacent to the inlet face is a tapering volume. In a similar way to that discussed above, the asymmetric (tapering) region of the delivery gallery 128 next to the inlet face 106 of the stack 104 can equalise the compressed air distribution along the stack 104.

The fuel cell assembly 100 of FIGS. 1a to 1c will now be described with a focus on the air flow through the delivery gallery 128, in particular first and second regions 128a, 128b of the delivery gallery 128. It will be appreciated that one or more of the features of the fuel cell assembly 100 that are described above may be considered as optional when a fuel cell assembly with first and second regions 128a, 128b of the delivery gallery 128, with the associated functionality, is provided. Likewise, the first and second regions 128a, 128b of the delivery gallery 128, and the associated functionality, may be considered as optional for fuel cell assemblies that have one or more of the features described above.

The delivery gallery 128 can be considered as having at least two regions: a first region 128a and a second region 128b. An aperture 140 is located between the first region 128a and second region 128b. This aperture 140 may be referred to as a choke aperture. An inlet port 120 opens into the first region 128a in order to provide the air to the delivery gallery. The second region 128b is defined, at least in part, by the inlet face 106 of the fuel cell stack.

The delivery gallery 128 and/or aperture 140 are configured such that, in use, air within the first region 128a of the delivery gallery 128 is turbulent, and air within the second region 128b of the delivery gallery 128 has a generally uniform pressure. In this way, the random distribution of the turbulent air flow in the first region 128a can be used to cool the fuel cell control system components 130 (or any other electronic components) in the first region. Also, the generally uniform air pressure in the second region is applied to the layers in the fuel cell stack in order to provide efficient and effective operation of the fuel cell stack 104.

The aperture 140 may provide a restriction to air flow between the first 128a and second regions 128b of the delivery gallery 128. The aperture 128 may represent a reduction in cross-sectional area in the flow path of the air from the first region 128a to the second region 128b of the delivery gallery 128. In this way, the air experiences a pressure change as it flows through the aperture 140 such that a generally uniform pressure is achieved along the length of the fuel cell stack.

In this example, the aperture is partly defined by a side surface of the bottom end face 112 of the fuel cell stack and a protrusion 142 from the inside of a side wall of the enclosure 102. The protrusion 142 extends towards the bottom end face 112 of the fuel cell stack 104. It will be appreciated that the protrusion 142 need not necessarily be provided as part of the enclosure 102; it can be formed by an extension of the bottom end face 112 of the stack 104 or any component or member that provides the necessary restriction for ensuring that the air within the second region 128b has generally uniform pressure, in use. In some examples, a protrusion may not be required at all.

It can be advantageous to provide the aperture 140 near the bottom end face 112 of the stack 104. This is because the volume of the first region 128a with turbulent flow is maximised for cooling the components 130, whilst only air with a generally uniform pressure is provided to the inlet face 106 of the stack 104.

Instead of having the protrusion 142 in the vicinity of the bottom end face 112 of the stack 104, a protrusion 144 may be provided in the vicinity of the top end face 110 of the stack 104. This may be particularly advantageous if the direction of air flow through the stack 104 is reversed, for example by reversing the direction of the fan 124, as an aperture defined by the protrusion 144 can provide a region downstream of the aperture that has a generally uniform pressure. In this example, the aperture is partly defined by a side surface of the top end face 110 of the fuel cell stack and the protrusion 144 from the inside of a side wall of the enclosure 102. The protrusion 144 extends towards the top end face 110 of the fuel cell stack 104. This protrusion 144 and corresponding aperture may have features and functionality that correspond to the protrusion 142 and corresponding aperture in the vicinity of the bottom end plate 112 that are discussed above.

It will be appreciated that when the direction of flow through the stack is reversed, the face of the stack that is labelled with reference 108 will be the inlet face and the ports that are labelled with reference 122 will be inlet openings into the enclosure. Therefore, the plenum extending between the components labelled with references 108 and 122 can be considered as a delivery gallery having a first region upstream of the protrusion 144 and a second region downstream of the protrusion 144.

One or more of the fuel cell control system components 130, such as a printed circuit board (PCB), may be considered as a diffuser inasmuch as they diffuse air that is provided into the first region 128a of the delivery gallery in order to impart turbulence on air flow in the first region 128a. The fuel cell control system components 130 can be considered as providing for good turbulent flow due to their irregular shape It will appreciated that the fuel cell control system components 130 can be considered as fixed with respect to the enclosure 102, that is, they are not free to move in normal use of the fuel cell assembly 100. Therefore, using the components 130 as a diffuser can provide a convenient means of imparting turbulence that does not require any moving parts or active components, which may be more susceptible to damage and may consume power. Furthermore, no additional components are required to achieve the desired turbulence. Embodiments disclosed herein can avoid a need for moving baffles or any additional means for recirculating the air.

In this example, the axis of the fan 124 is directed towards at least a region of the components 130. The axis of the fan 124 is not in the direction of the aperture 140 to the second region 128b. This can discourage laminar flow of air from the fan 124 to the second region 128b as the air will be deflected by the components 130 before it reaches the aperture 140. Therefore, aligning the fan in a specific way can encourage turbulent flow in the first region 128a. Examples of such specific fan alignments include: not pointing towards the aperture 140; transverse to the plane of the layers in the stack 104; perpendicular or transverse to the direction of air flow through the stack 104; perpendicular or transverse to the principal air flow direction through the first region 128a; and toward one or more components located in the first region 128a of the delivery gallery.

Although the described embodiments show the fan 124 positioned in the inlet flow path providing a somewhat positive air pressure in the delivery gallery 128, it will be understood that the fan or other air flow generator could be disposed in the exhaust gallery to generate a somewhat negative air pressure therein.

In one or more of the embodiments disclosed herein, at least part of the first separation wall 132 may be movable so as to selectively provide an opening between the delivery gallery 128 and the exhaust gallery 126. For example, at least a portion of the first separation wall 132 may be fixed to the baffle 118 and may be releasable from the top end face 110 of the stack, or at least a portion of the first separation wall 132 may be fixed to the top end face 110 of the stack and may be releasable from the baffle 118. Providing such an opening can enable warm air to be recirculated from the exhaust gallery 126 to the delivery gallery 128. This can provide operational advantages as the air flow through the stack 104 is pre-heated.

At least a portion of the first separation wall 132 may be provided by a bimetallic strip such that once the temperature of the air in the exhaust gallery 126 or delivery gallery 128 is above or below a threshold value the metallic strip deforms in order to allow or prevent recirculation. In alternative embodiments, the first separation wall 132 may be electrically controlled in accordance with one or more measured operating parameters such as air temperature. The first separation wall 132 may be made from nitinol.

As will be appreciated from the description of FIGS. 1a to 1c, the aperture 140 in this example extends in a longitudinal direction into the page of FIG. 1b. In some embodiments, the width of the aperture 140 may vary in the longitudinal direction, in order to assist in providing a uniform air pressure in the second region 128b. The width of the aperture 140 may vary uniformly or non-uniformly in the longitudinal direction. The aperture 140 may get wider in the longitudinal direction away from the fan 124. This can further assist in equalising the air pressure in the second region 128b in spite of the air pressure in the first region 128a on the other side of the aperture 140 being lower at positions further away from the fan 124.

It will be appreciated that the width of the aperture 140 can be defined by using a protrusion 142 with the requisite size and shape.

It will also be appreciated that the physical properties of any aperture defined by a protrusion 144 provided in the vicinity of the top end face 110 of the stack 104 can have the same characteristics as the aperture 140 in the vicinity of the bottom end face 112 of the stack 104. Similarly, the physical properties of a protrusion 144 provided in the vicinity of the top end face 110 of the stack 104 can have the same characteristics as the protrusion 142 in the vicinity of the bottom end face 112 of the stack 104.

The dimensions of any aperture or protrusion can be defined so as to tune the pressure response of the aperture as air passes from the first region 128a to the second region 128b.

Throughout the present specification, the descriptors relating to relative orientation and position, such as "top", "bottom" and "side" as well as any adjective and adverb derivatives thereof, are used in the sense of the orientation of the fuel cell assembly as presented in the drawings. However, such descriptors are not intended to be in any way limiting to an intended use of the described or claimed invention.

The fuel cell assembly disclosed herein may be suitable for a charger for portable electronic devices such as mobile telephones, personal computing devices and the like.

The invention claimed is:

1. A fuel cell assembly comprising:
an enclosure having a fuel cell stack mounted therein,
an inlet opening into the enclosure,
the fuel cell stack having an inlet face for receiving coolant/oxidant fluid,
a delivery gallery extending from the inlet in the enclosure to the inlet face of the fuel cell stack,
the delivery gallery having a first region and a second region separated by an aperture,
wherein the delivery gallery and aperture are configured such that, in use, coolant/oxidant fluid within the first region of the delivery gallery is turbulent, and coolant/oxidant fluid within the second region of the delivery gallery has a generally uniform pressure.

2. The fuel cell assembly of claim 1 in which the aperture defines a restriction to flow of the coolant/oxidant between the first and second regions of the delivery gallery.

3. The fuel cell assembly of claim 1 in which the aperture represents a reduction in cross-sectional area in the flow path of the coolant/oxidant flow between the first and second regions of the delivery gallery.

4. The fuel cell assembly of claim 1 in which the aperture is defined, at least in part, by a bottom end face of the fuel cell stack.

5. The fuel cell assembly of claim 4 in which the aperture is defined, at least in part, by a protrusion extending towards the bottom end face of the fuel cell stack.

6. The fuel cell assembly of claim 5 in which the protrusion extends away from an internal wall of the enclosure.

7. The fuel cell assembly of claim 6 in which the protrusion comprises part of an internal wall of the enclosure.

8. The fuel cell assembly of claim 1 in which the aperture extends in a longitudinal direction and the width of the aperture varies in the longitudinal direction.

9. The fuel cell assembly of claim 8 in which the aperture gets wider in the longitudinal direction away from a fan or air flow generator.

10. The fuel cell assembly of claim 1 further comprising a diffuser within the first region of the delivery gallery, the diffuser configured to impart turbulence on oxidant I coolant received from the inlet of the enclosure.

11. The fuel cell assembly of claim 10 in which the diffuser is fixed such that it is not free to move in normal use of the fuel cell assembly.

12. The fuel cell assembly of claim 10 in which the diffuser comprises one or more fuel cell control system components.

13. The fuel cell assembly of claim 1, further comprising a fan located within the enclosure configured to cause the coolant/oxidant to be transferred from the inlet in the enclosure to the inlet face of the fuel cell stack.

14. The fuel cell assembly of claim 13 in which the axis of the fan is directed away from the aperture.

15. The fuel cell assembly of claim 13 in which the axis of the fan is directed towards at least a region of fuel cell control system.

16. The fuel cell assembly of claim 13 in which the axis of the fan is transverse to the plane of the layers in the stack.

17. The fuel cell assembly of claim 13 in which the axis of the fan is transverse to the direction of coolant/oxidant flow through the stack.

18. The fuel cell assembly of claim 13 in which the axis of the fan is transverse to the principal air flow direction through the first region.

19. The fuel cell assembly of claim 1, further comprising a separation wall configured to separate the delivery gallery from an exhaust gallery, wherein at least part of the separation wall is movable so as to selectively provide an opening between the delivery gallery and the exhaust gallery.

20. The fuel cell assembly of claim 19, wherein the at least part of the separation wall is moveable in accordance with the temperature of the coolant/oxidant in the exhaust gallery and/or delivery gallery.

* * * * *